Patented Mar. 15, 1949

2,464,364

UNITED STATES PATENT OFFICE 2,464,364

PROCESS OF MAKING ALKYL ACRYLATES

Francis Clarke Atwood, Newton, Mass., assignor to Atlantic Research Associates, Inc., Newtonville, Mass., a corporation of Delaware No Drawing. Application March 11, 1943, Serial No. 478,835

7 Claims. (Cl. 260—486)

The present invention relates to the conversion of lactates into the corresponding acrylates such, for example, as the formation of alkyl acrylates from alkyl lactates. As set forth in my copending application, Serial No. 462,048 filed October 14, 1942, which has become abandoned, the manufacture of acrylate monomers is of growing importance commercially and various methods have been proposed by means of which such manufacture may be expedited.

In my aforementioned application, I have pointed out the theoretical problem involved to be the dehydration of the lactate by the combination of the hydroxyl group in the alpha position with the hydrogen in the beta position to form water. In view of the fact that the carboxyl group tends to make the bond beween the hydroxy oxygen and the carbon to which it is attached stronger than the other carbon to carbon bonds in the system, when the lactate is pyrolyzed, the carbon to carbon bonds ordinarily tend to break rather than the carbon to oxygen bond through which the hydroxyl group is attached and there results a decomposition into gases rather than the formation of the acrylate.

As I have stated, in my above-identified copending application, in order to accomplish the dehydration of the lactate, it has heretofore been proposed to acetylate the hydroxy group by reacting the lactate with acetic anhydride or ketene. This accomplishes, in the acetylated compound, a weakening of the bond through oxygen at the alpha position to such an extent that the bond can be broken upon pyrolysis to produce the acrylic acid derivative.

To accomplish this, as described in my aforesaid copending application, I may direct the lactate and acetic anhydride into a pyrolysis furnace either separately or as a mixture and under such conditions that no reaction occurs before pyrolysis. For example, I may convert the lactate into the acrylate by direct pyrolysis and without the necessity of the intermediate conversion of the lactate into the acetoxy propionate by feeding the lactate and acetic anhydride directly into the pyrolysis chamber.

In the cracking of the lactate to form the acrylate in accordance with the various methods outlined in my aforesaid application, I find that difficulty arises due to a tendency of the cracking pipes to choke by reason of the formation of coke because of the decomposition of traces of lactic acid and possibly other compounds in the lactate. This accumulation tending to choke the cracking pipes has necessitated frequent shutting down of the cracking furnace in order to enable the pipes to be cleaned.

The temperature maintained in the cracking furnace, as stated in my copending application, is within the range of 450 to 700° C., within which temperature range lactic acid readily decomposes.

I have now discovered that the lactate and the acetic anhydride may be introduced into the cracking furnace without the presence of lactic acid or other undesirable products by first vaporizing the compounds under suitable conditions and then directing the vapor into the cracking furnace. I find that this may be accomplished by elevating the liquid lactate and acetic anhydride at temperatures well below the range of cracking temperatures above stated, such vaporizing temperatures being those at which the lactic acid will remain unvaporized and the conditions being such as to minimize or eliminate the decomposition of the lactic acid. My discovery includes the vaporization, in a similar manner, of other compounds or mixtures of compounds from which alkyl acrylates may be formed by cracking at high temperatures in the vapor form, such as alkyl alpha-acetoxy propionates (acetylated lactates) alone or in admixture with acetic acid or alkyl acetates. The method is particularly advantageous when it is desired to vaporize simultaneously two materials which have widely separated boiling points.

The present invention, accordingly, has for an object the provision of a method by means of which a compound or compounds may be introduced into a pyrolyzing furnace to form alkyl acrylates, such as methyl acrylate, ethyl acrylate, etc., without the inclusion of other compounds such as lactic acid which give rise to difficulties in the pyrolyzing operation such as hereinabove mentioned.

A further object of the invention is to provide a method of the above character wherein, by a suitable preparatory operation, a compound or compounds to be introduced into a pyrolyzing furnace may be free of other compounds normally present therein and which give rise to difficulties in the operation of the pyrolyzing furnace.

The foregoing objects may be attained by the initial treatment of the compound or compounds to be pyrolyzed in such fashion that they are vaporized and the vapors, freed of the objectionable compounds, are then introduced into the pyrolyzing furnace. The attainment of these objects is accomplished more specifically by the flashing of the lactate and the companion compound, such as acetic anhydride, at temperatures below pyrolyzing temperatures and within a range such that the lactic acid will not be decomposed or at least its decomposition minimized. The flashed compounds are then directed into the pyrolyzing chamber and the cracking operation performed, thus avoiding the formation of coke in the cracking furnace due to the decomposition of the lactic acid.

The process has the additional advantage that the latent heat required for vaporization and the sensible heat necessary to raise the vapors to the temperature in the vaporizing chamber may be supplied from relatively lower temperature sources than that necessary for maintaining the higher temperatures in a cracking furnace. The heat supplied during vaporization need not be supplied by the cracking furnace, thereby increasing the capacity and efficiency of the latter.

In order that the invention may be more fully understood, I will now proceed to describe, in greater detail, the manner in which it may be realized.

As above stated, before the lactate and the anhydride are introduced into the cracking furnace where the temperature may be within the range of 450 to 700° C., I first subject the lactate and the acetic anhydride, or other compound used in the pyrolyzing of the lactate, to a temperature below the cracking temperature for the compounds being flashed and above their boiling point. This temperature may vary with the pressure used, depending upon the requirements of operation.

I find that the compound may be flashed at temperatures less than its boiling point temperature under certain conditions, an important factor being to provide a sufficient extent of heated surface and to direct the compound against such surface before it has a chance to boil or agglomerate in large bubbles to any great extent.

The flashing of the lactate and anhydride or other compound may be accomplished, as aforesaid, by directing the liquids into a suitable fluid maintained at a suitable temperature as aforesaid. For example the temperature may be within the range of 150 to 275° C. at pressures of from 2 to 25 pounds.. The fluid used may be a liquid such as an oil having a sufficiently high boiling point to prevent it from being vaporized and carried over with the other vapor into the cracking furnace. The oil will thus contain lactic acid or other compounds that are to be prevented from going over into the cracking furnace and, if the temperature is such that the lactic acid decomposes, the oil thus entrains the coke and other compounds.

In order to provide an operation that is continuous, the oil may be circulated continuously and filtered so that the aforesaid compounds may be removed and the oil returned to the circulating system for further heating and use. The lactate and acetic anhydride or other compound may be introduced directly into the oil and the flashed vapors removed and directed into the cracking furnace in any suitable fashion. In an operation that has been performed successfully, the lactate and the anhydride were pumped into the flashing chamber under a pressure of 23 to 25 lbs. The operation has been carried out with a destruction of not more than 4% of the mixture introduced into the flashing chamber as non-condensable gases.

As an alternative procedure, I have found that the lactate may be flashed effectively by directing the mixture against a metallic surface of sufficient area and under such conditions that the liquid will be heated by the surface and flash before it has a chance to boil or agglomerate substantially in large bubbles. The residue which does not flash remains as a carbonaceous mass which may be readily removed by a scraper or other appliance. For example, the liquid may be introduced into a pipe having a continuous scraper for removing the carbonaceous material. In order to facilitate the removal of the unflashed material, I have found that the surface against which the liquid is directed in order to accomplish its flashing may be initially coated with oil so that the oil will cook into the surface and thus prevent the adherence of the carbonaceous material thereto.

From the foregoing it will thus be seen that the present invention utilizes the operation of first flashing the compounds to be introduced into the pyrolysis chamber under such conditions as to prevent the cracking of such compounds and to enable lactic acid and decomposition products such as coke, as well as other compounds present in the lactate which is being flashed, from going over into the cracking furnace. The particular manner in which the flashing operation is carried out may vary and the invention is not to be limited save as defined in the appended claims.

I claim:

1. In a method of cracking a lactate to form an acrylate at a relatively high cracking temperature, the steps comprising subjecting a lactate bearing composition from which an alkyl acrylate may be formed by cracking at high temperature to a preliminary and relatively low temperature heating externally of the cracking furnace to vaporize the lactate, separating the lactate vapors from the unvaporized portion of said lactate bearing composition, and then passing the thus separated lactate vapors through a cracking furnace and subjecting them to temperatures sufficiently high to crack the lactate and form an acrylate.

2. In a method of cracking a lactate to form an acrylate at a relatively high cracking temperature, the steps comprising subjecting a lactate bearing composition from which an alkyl acrylate may be formed by cracking at high temperature including an alkyl alpha-acetoxypropionate to a preliminary and relatively low temperature heating externally of the cracking furnace to vaporize the lactate, separating the lactate vapors from the unvaporized portion of said lactate bearing composition, and then passing the thus separated lactate vapors through a cracking furnace and subjecting them to temperatures sufficiently high to crack the lactate and form an acrylate.

3. In a method of cracking a lactate to form an acrylate at a relatively high cracking temperature, the steps comprising subjecting an alkyl lactate bearing composition from which an alkyl acrylate may be formed by cracking at high temperature to a preliminary and relatively low temperature heating externally of the cracking furnace to vaporize the lactate, separating the lactate vapors from the unvaporized portion of said lactate bearing composition, and then passing the thus separated lactate vapors through a cracking furnace and subjecting them to temperatures sufficiently high to crack the lactate and form an acrylate.

4. In a method of cracking a lactate to form an acrylate at a relatively high cracking temperature, the steps comprising subjecting a methyl lactate and acetic anhydride to a preliminary and relatively low temperature heating externally of the cracking furnace to vaporize the methyl lactate and acetic anhydride, separating the methyl lactate vapors and acetic anhydride vapors from the unvaporized portion and then passing the thus separated lactate and acetic anhydride vapors through a cracking furnace and subjecting them to temperatures sufficiently high to crack the lactate and form an acrylate.

5. In a method of cracking a lactate to form an acrylate at a relatively high cracking temperature, the steps comprising subjecting a lactate bearing composition from which an alkyl acrylate may be formed by cracking at high temperature containing an alkyl lactate and an anhydride to a preliminary and relatively low temperature heating externally of the cracking furnace to vaporize the lactate and anhydride, separating such vapors from the unvaporized portion and then passing the thus separated lactate and anhydride vapors through a cracking furnace and subjecting them to temperatures sufficiently high to crack the lactate and to form an acrylate.

6. In a method of cracking a lactate to form an acrylate at a relatively high cracking temperature, the steps comprising subjecting a lactate bearing composition from which an alkyl acrylate may be formed by cracking at high temperature to preliminary heating in an oil maintained at a temperature of from 150° to 275° C. whereby to vaporize the lactate, and then separating the vapors thus formed from the unvaporized portion and passing the vapors through a cracking furnace and subjecting the vapors to temperatures of from 450° to 700° C.

7. In a method of cracking a lactate to form an acrylate at a relatively high cracking temperature, the steps comprising subjecting a lactate bearing composition from which an alkyl acrylate may be formed by cracking at high temperature containing an alkyl lactate and an anhydride against a metallic surface at a temperature of between 150° and 275° C. whereby to flash the lactate and anhydride before boiling or agglomeration sets in, separating the lactate and anhydride vapors from the unvaporized portion and passing the separated vapors through a cracking furnace separate from said metallic surface and maintained at a temperature sufficiently high to crack the lactate and to form an acrylate.

FRANCIS CLARKE ATWOOD.

REFERENCES CITED

The following references are of record in the file of this patent:

UNITED STATES PATENTS

| Number | Name | Date |
| --- | --- | --- |
| 2,121,731 | Collings | June 21, 1938 |
| 2,183,357 | Ritchie et al. | Dec. 12, 1939 |
| 2,265,814 | Ritchie et al. | Dec. 9, 1941 |
| 2,356,247 | Kirk et al. | Aug. 22, 1944 |

OTHER REFERENCES

Rehberg et al.: "J. Am. Chem. Soc.," vol. 65, June 1943, pages 1003–1006.